United States Patent [19]

Doan

[11] 4,136,361
[45] Jan. 23, 1979

[54] VIDICON READER

[76] Inventor: Duc Doan, 7814 S. San Pedro St., Los Angeles, Calif. 90003

[21] Appl. No.: 819,391

[22] Filed: Jul. 27, 1977

Related U.S. Application Data

[63] Continuation-in-part of Ser. No. 704,521, Jul. 12, 1976.

[51] Int. Cl.² .................... H04N 7/00; H04N 5/30
[52] U.S. Cl. .................................. 358/94; 358/229
[58] Field of Search .................................. 358/94, 229

[56] References Cited
U.S. PATENT DOCUMENTS 3,993,865  11/1976  Browne .................................. 358/94

*Primary Examiner*—Howard W. Britton
*Attorney, Agent, or Firm*—Brown & Martin

[57] ABSTRACT

A vidicon reader consisting of a vidicon camera dimensioned to the size of a penlight for being handheld, e.g., approximately 20 millimeters in diameter, with associated video electronics integrally packaged therewith having an FM modulated composite video output for reception by a television receiver for video display. The user holds the vidicon camera in his hand like a pen as he uses it to scan a printed page, for example, which is then magnified on the television receiver screen for better readability.

3 Claims, 2 Drawing Figures

VIDICON READER

REFERENCE TO RELATED APPLICATION

The present application is a Continuation-In-Part of my co-pending application Ser. No. 704,521, filed July 12, 1976 and entitled Vidicon Reader.

BACKGROUND OF THE INVENTION

The present invention relates to a vidicon reader, and more particularly to a vidicon reader having a miniature handheld vidicon camera tube.

Learning takes place by use of the senses. The more senses used, the faster the learning. For example, if the hand or finger follows along with the eye in reading a printed page, the learning is greater even though the reading speed may be slower.

It is also desirable for reading purposes that the printed material or characters be magnified. This enhances the readability for certain people who have eye problems.

The use of vidicon readers are known. For example, see U.S. Pat. No. 3,819,855, issued June 1974 to Rush, and U.S. Pat. No. 3,816,646, issued June 1974 to Cinque. These however, are not suitable for the purposes herein proposed in that they have mechanically manipulated camera with fixed scanning. Another problem is that they do not provide handheld cameras either in size or operation.

It is therefore desirable that some means be available which can be handheld and manipulated for use in enhancing the readability of printed material and characters, and the learning therefrom.

SUMMARY AND OBJECTS OF THE INVENTION

According to the invention, a vidicon reader is provided in which a handheld vidicon camera tube with integrated electronics therein has a composite video output for coupling to the antenna terminals of a television receiver. The user hand scans a printed page, for example, with the vidicon camera tube, and can read the intelligence on the screen of a television receiver, which of course amplifies the size of the intelligence. It is designed to help people with vision problems and defects, such as dyslexia for coordinating the printed word with the visual image.

An object of the present invention is the provision of a vidicon reader. Another object of the invention is the provision of a vidicon reader utilizing a handheld vidicon camera tube.

Yet another object of the invention is the provision of a vidicon reader which is extremely simple to install and operate.

Still another object of the invention is the provision of a vidicon reader for utilization with a standard television receiver.

BRIEF DESCRIPTION OF THE DRAWINGS

Other objects and many of the attendant advantages of the present invention will be readily appreciated as the same becomes better understood by reference to the following detailed description when considered in connection with the accompanying drawings in which like reference numerals designate like parts through the Figures thereon and wherein.

DETAILED DESCRIPTION OF THE DRAWING

Figure 1:
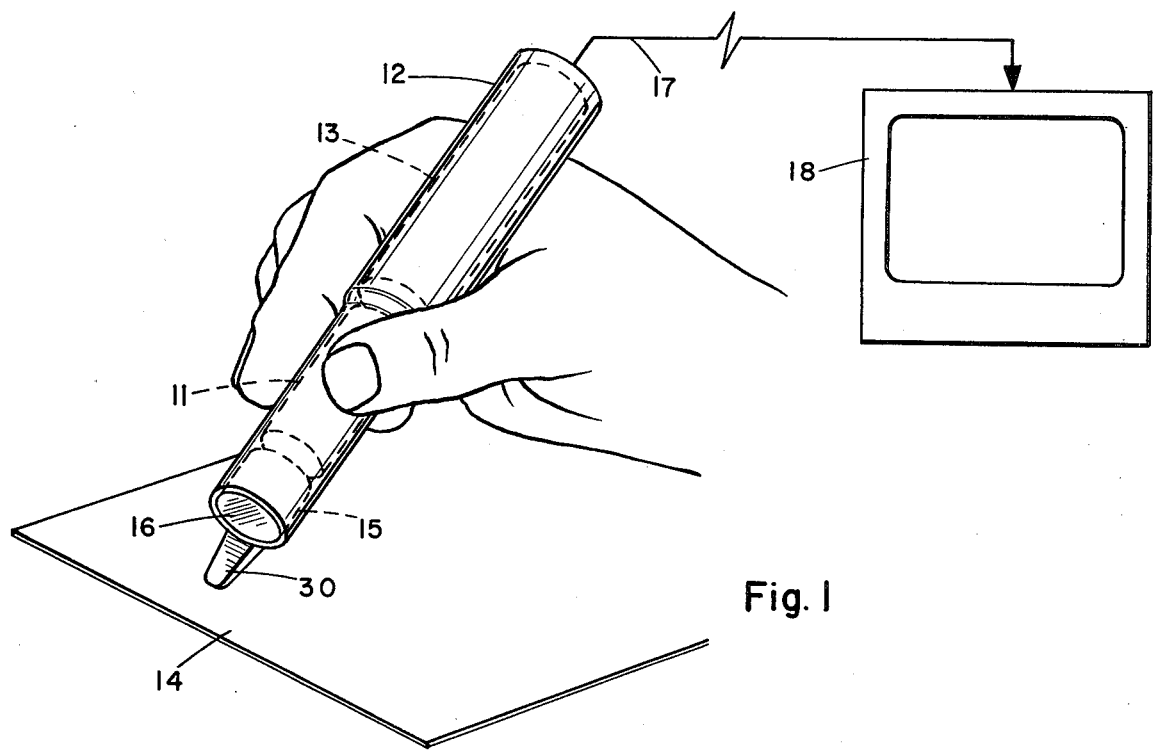
FIG. 1 illustrates the preferred embodiment of the present invention in use.

Referring to FIG. 1, vidicon camera tube 11 is contained within housing 12 along with electronics 13. Lens system 15 receives information such as an image or character from source 14 at its pickup face 16. Electronics 13 incorporates the information picked up by vidicon camera tube 11 into a FM modulated composite video output at 17 which is coupled to television receiver 18. This output may be transmitted either by cable or by a transmitter to a television receiver.

Figure 2:
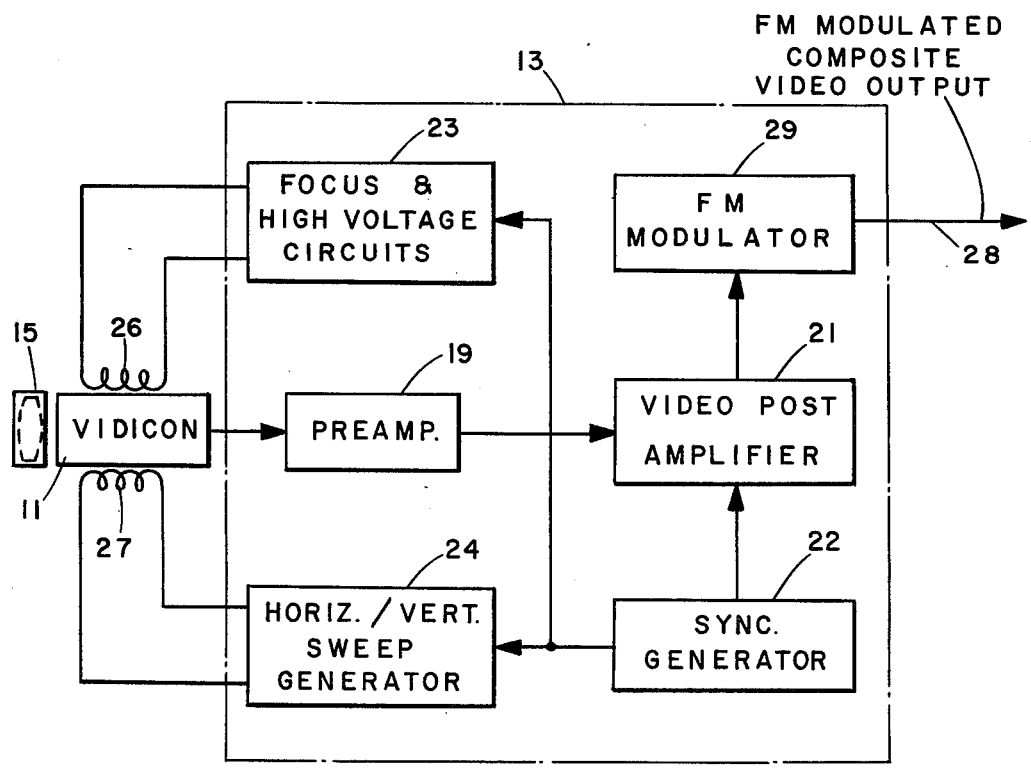
FIG. 2 is a block diagram of the electronic portion of the embodiment of FIG. 1.

Referring to FIG. 2, vidicon camera tube 11 picks up information through lens system 15 which it transmits to preamp 19 and which has an output coupled to an input of video post amplifier 21. Sync generator 22 is coupled to an input of focus and high-voltage circuit block 23 and to horizontal and vertical sweep generator block 24. The output of focus and high-voltage circuit block 23 is coupled to focus and acceleration coils indicated generally at 26 and the output of horizontal and vertical sweep generator block 24 is coupled to horizontal and vertical sweep generator coils indicated generally at 27. Sync generator 22 also has a horizontal and vertical sync output coupled to another input of video post amplifier 21, which in turn is connected to an FM modulator 29 to provide a composite video output at output terminal 28.

OPERATION

Referring back to FIG. 2, the electronics shown as block 13 in FIG. 1 is broken down to illustrate a typical state of the art vidicon electronics system with sync generator 22 supplying sync signals for the horizontal and vertical sweep generator and the blanking and focus synchronization signals for the blanking circuitry and focus coil 26. The output of the vidicon is amplified in preamp 19 and together with the output of sync generator 22 modulates a carrier signal generated within video post amplifier 21 which results in a composite video output and output terminal 28 of FM modulator 29.

Referring back to FIG. 1, it can be seen that all of the electronics of FIG. 2 is incorporated in block 13, which is contained within housing 12 along with vidicon camera tube 11 including the signal plate. Housing 12 is dimensioned for being handheld and is the approximate size of a standard pen flashlight, which is approximately 20 millimeters in diameter. A camera of this size can be constructed with today's technology. Such a camera with black and white output can be obtained on special order from the CIRCON Corporation, 749 Ward Drive, Santa Barbara, California 93111. This company currently markets a color camera as model MV 9270 having a length of 8 inches and a 2 × 2 inch cross section. Other models including black and white are produced for use with microscopes. Other solid state image sensors may be used in the camera, such as that disclosed at pages 29 through 31 of the February 1975 issue of "Popular Electronics", Vol. 7, No. 2, New York, N.Y. With either of these constructions, the optical lens may be fixed, and thereby further contribute to the compactness of the structure.

The output at 17 from the electronics 13 is coupled either through a coaxial cable or by a video transmitter to the antenna terminals of a television receiver 18. In operation, the user holds housing 12 in his hand and scans an information sheet 14 which can be typical printed page, for example. The housing 12 has a projecting spacer or guide member 30 which allows the user to rest the lower extension of housing 12 at a 45° angle to the page. Of course, the vidicon focusing is adjusted for this range. This is then presented on the screen of television receiver 18 in an amplified fashion, allowing a person with limited vision to read with this aid and allowing a person having a medical problem such as dyslexia to associate the printed word with an unscrambled visual physiological reception.

Even further miniaturization of the camera can be accomplished by placing more of the electronics in a remote cabinet or housing to which the camera is connected by cable. For example, only those components necessary to operate the scan of the image plate need be in the housing 12. The remaining components such as amplifiers and transmitters may be located in a small remote chasis and connected to the camera by a cable.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

Having described my invention, I now claim:

1. A vidicon reader comprising:
a vidicon camera including an elongated generally cylindrical housing dimensioned approximately 20 millimeters in diameter adapted to be held in the hand in the same manner as a writing pen;
guide means extending from said housing for engaging and making slidable contact with the surface of a sheet of material to be read,
video television electronic means integrally packaged with and coupled to an output of said vidicon camera; and
television receiving means coupled to an output of said video television electronics means for receiving and displaying a visual display of characters viewed by the camera.

2. The vidicon reader of claim 1 wherein:
said television receiving means is coupled to an output of said video television electronic means by cable means.

3. The vidicon reader of claim 1, wherein:
said television receiving means is coupled to an output of said video television electronic means by antenna means.

* * * * *